(12) United States Patent
Kato et al.

(10) Patent No.: US 11,300,673 B2
(45) Date of Patent: Apr. 12, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Seishiro Kato, Kanagawa (JP); Kazuo Hayashi, Kanagawa (JP); Suguru Oue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 336 days.

(21) Appl. No.: 16/546,976

(22) Filed: Aug. 21, 2019

(65) Prior Publication Data

US 2020/0278437 A1    Sep. 3, 2020

(30) Foreign Application Priority Data

Mar. 1, 2019 (JP) .............................. JP2019-037690

(51) Int. Cl.
*G01S 13/42* (2006.01)
*G01S 5/14* (2006.01)
*G01S 5/02* (2010.01)
*G01S 5/00* (2006.01)

(52) U.S. Cl.
CPC .............. *G01S 13/42* (2013.01); *G01S 5/009* (2013.01); *G01S 5/0242* (2013.01); *G01S 5/14* (2013.01)

(58) Field of Classification Search
CPC .......... G01S 13/42; G01S 11/02; G01S 11/06; G01S 5/0242
USPC ........................................................ 342/458
See application file for complete search history.

(56) References Cited

U.S. PATENT DOCUMENTS

2005/0270234 A1* 12/2005 Wolf ......................... G01S 3/40
342/443
2018/0158288 A1* 6/2018 Logan ..................... G01S 19/51

FOREIGN PATENT DOCUMENTS

JP        2017-142180 A    8/2017

* cited by examiner

*Primary Examiner* — Harry K Liu
(74) *Attorney, Agent, or Firm* — Oliff PLC

(57) ABSTRACT

An information processing apparatus includes: an acquisition unit configured to acquire pieces of information on position of the information processing apparatus; a receiving unit configured to receive radio waves from a search target apparatus; a calculation unit configured to calculate the position of the search target apparatus using the pieces of information on position of the information processing apparatus acquired at plural points by the acquisition unit and using a distance between the information processing apparatus and the search target apparatus estimated from an intensity of the radio waves received by the receiving unit at each of the plural points; and a notification unit configured to send notification to guide a searcher to the position of the search target apparatus calculated by the calculation unit.

8 Claims, 11 Drawing Sheets

FIG. 6

MEASUREMENT DATA EXAMPLE

| MEASUREMENT POINTS | INFORMATION ON POSITION OF MOBILE TERMINAL APPARATUS | RADIO WAVE INTENSITY | DISTANCE TO SEARCH TARGET APPARATUS 20 (m) |
|---|---|---|---|
| MEASUREMENT POINT A | (139° 44' 55", 35° 49' 18") | 48 | 825.9 |
| MEASUREMENT POINT B | (139° 44' 19", 36° 49' 55") | 59 | 256.2 |
| MEASUREMENT POINT C | (139° 12' 23", 35° 59' 49") | 68 | 125.3 |
| MEASUREMENT POINT D | (139° 33' 28", 35° 49' 01") | 19 | 1215.7 |
| MEASUREMENT POINT E | (139° 15' 55", 35° 49' 18") | 6 | 3589.1 |
| MEASUREMENT POINT F | (139° 12' 55", 37° 59' 48") | 12 | 1956.3 |

US 11,300,673 B2

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-037690 filed Mar. 1, 2019.

BACKGROUND

(i) Technical Field

The present disclosure relates to an information processing apparatus and a non-transitory computer readable medium.

(ii) Related Art

JP-A-2017-142180 discloses a position estimation system that estimates the position of a transmitter based on a measurement result obtained at plural points by moving the position of one mobile terminal and measuring received radio wave intensity and positions of the mobile terminal at plural different points, the mobile terminal including a radio wave measurement unit that receives a radio wave transmitted by the transmitter to measure intensity of the received radio wave, and a position measurement unit that measures the position of the mobile terminal itself.

SUMMARY

Aspects of non-limiting embodiments of the present disclosure relate to providing an information processing apparatus and a non-transitory computer readable medium which allow a searcher to reach a search target apparatus even when the searcher cannot reach the search target apparatus in one measurement for specifying the position of the search target apparatus by receiving a radio wave transmitted from the search target apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: an acquisition unit configured to acquire pieces of information on position of the information processing apparatus; a receiving unit configured to receive radio waves from a search target apparatus; a calculation unit configured to calculate the position of the search target apparatus using the pieces of information on position of the information processing apparatus acquired at plural points by the acquisition unit and using a distance between the information processing apparatus and the search target apparatus estimated from an intensity of the radio waves received by the receiving unit at each of the plural points; and a notification unit configured to send notification to guide a searcher to the position of the search target apparatus calculated by the calculation unit.

BRIEF DESCRIPTION OF THE DRAWINGS

Exemplary embodiments of the present invention will be described in detail based on the following figures, wherein:

FIG. 6 is a diagram showing an example of measurement data in a case where measurement is performed at each of plural measurement points while the searcher is moving.

DETAILED DESCRIPTION

Next, exemplary embodiments of the present disclosure will be described in detail with reference to the drawings.

Figure 1:
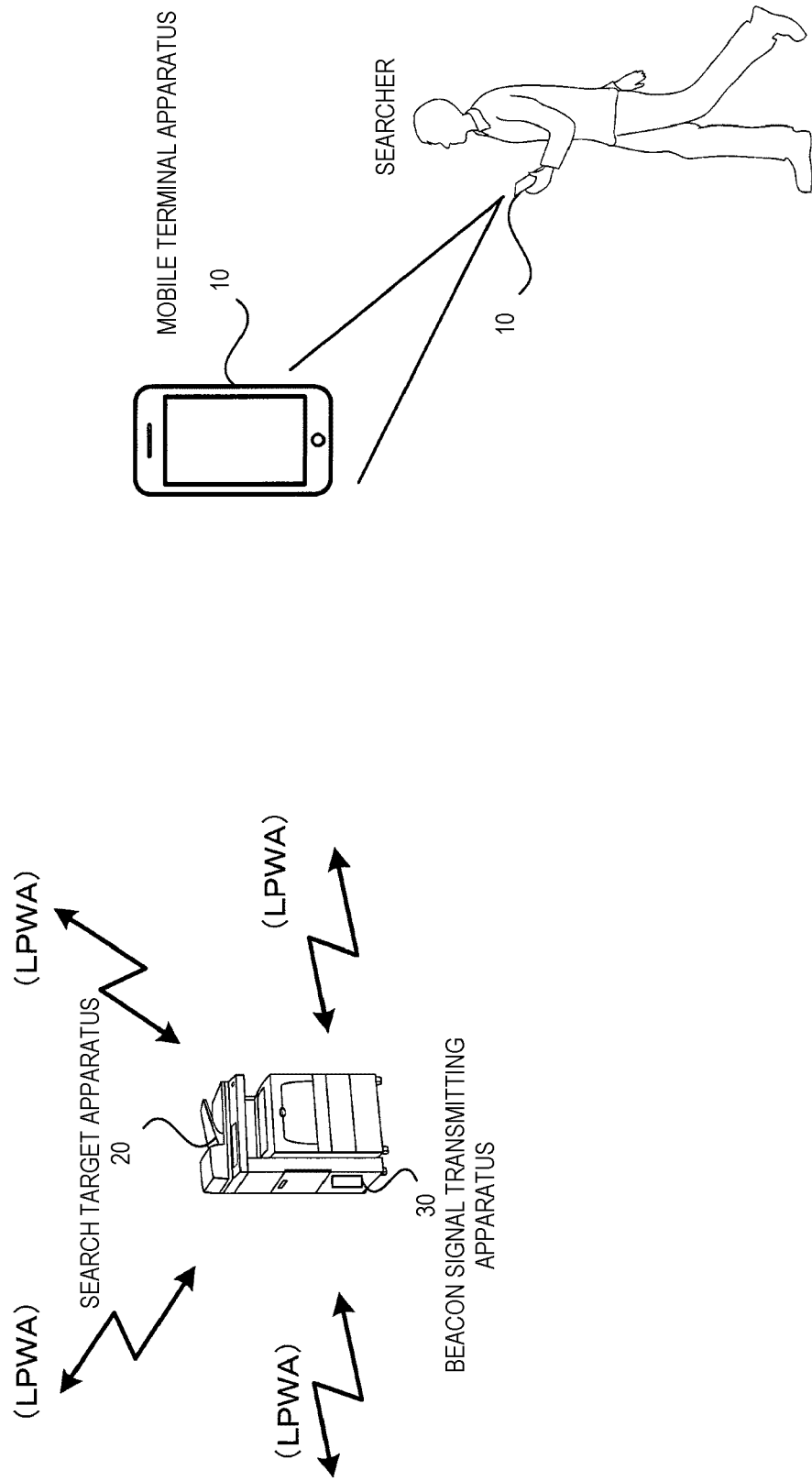
FIG. 1 is a diagram showing the configuration of a position search system according to an exemplary embodiment of the present disclosure.

FIG. 1 is a diagram showing the configuration of a position search system according to an exemplary embodiment of the present disclosure.

As shown in FIG. 1, a position search system according to the exemplary embodiment of the present disclosure is constituted by a search target apparatus 20 and a mobile terminal apparatus 10 operated by a searcher.

Then, the position search system according to the present exemplary embodiment is used to search office machines such as a printer and various apparatus whose location is unknown due to loss or theft so as to find out these apparatuses.

In the position search system according to the present exemplary embodiment, a case where a searcher holding the mobile terminal apparatus 10 finds out the search target apparatus 20 shown in FIG. 1 will be described.

Here, the search target apparatus 20 is equipped with a beacon signal transmitting apparatus 30 that transmits a beacon signal including its identification information via a Low Power Wide Area (LPWA) line which is a power-saving wide area wireless communication line.

The LPWA is also referred to as a Low Power Wide Area Network (LPWAN), and is a wireless communication line which cannot perform high speed communication but can perform data transceiving in a wide area with low power consumption.

Specifically, by using the LPWA, data transceiving using a radio wave of, for example, a 920 MHz band can be performed, and data transceiving between apparatuses separated by a distance of several kilometers to several tens of kilometers can be performed.

Further, even when a power supply of the beacon signal transmitting apparatus 30 is performed by a battery, it is possible to realize low power consumption with which the transmission of the beacon signal can be continued in units of several years, for example, five to ten years.

Further, the mobile terminal apparatus 10 held by the searcher is constituted by, for example, a smartphone, and has a function of receiving radio waves of the LPWA line.

Figure 2:
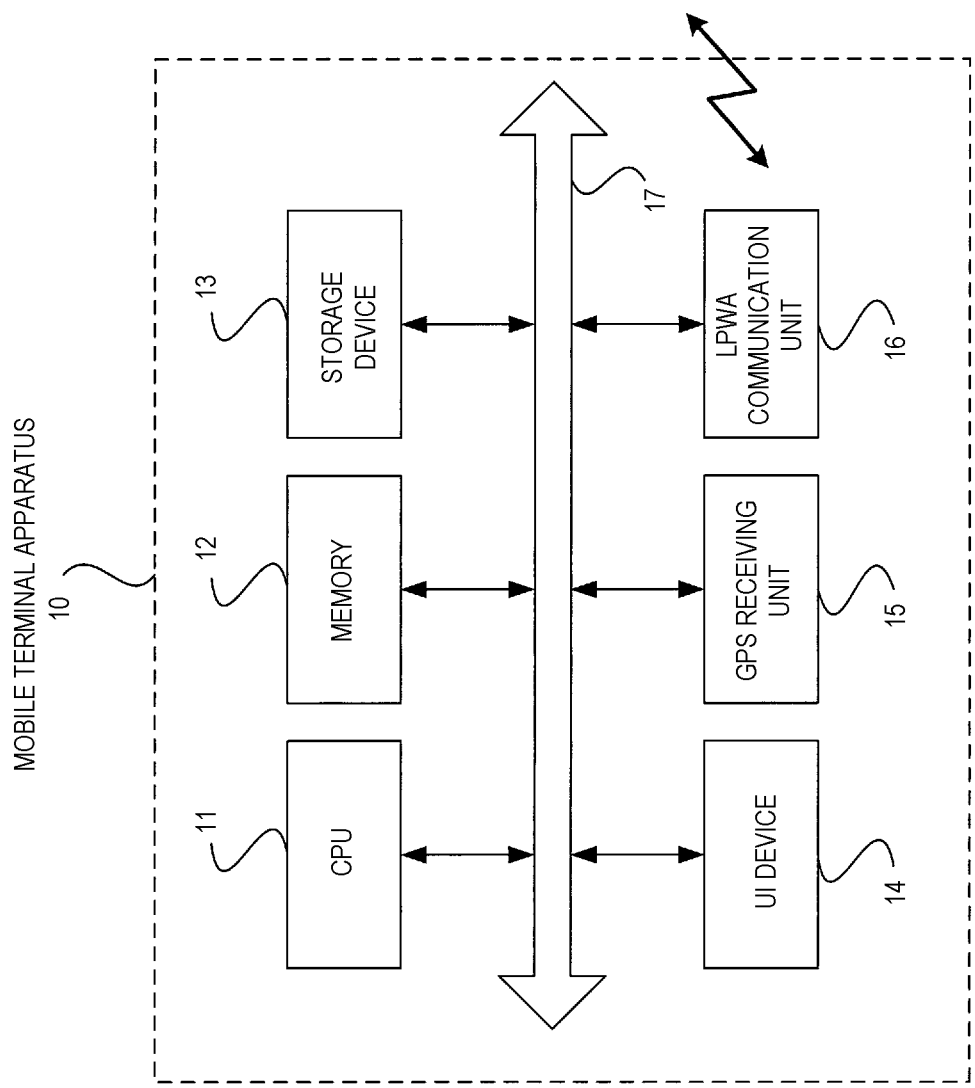
FIG. 2 is a block diagram showing the hardware configuration of a mobile terminal apparatus 10 according to the exemplary embodiment of the present disclosure.

Next, the hardware configuration of the mobile terminal apparatus 10 in the position search system of the present exemplary embodiment is shown in FIG. 2.

As shown in FIG. 2, the mobile terminal apparatus 10 includes a CPU 11, a memory 12, a storage device 13 such as a flash memory, a user interface (abbreviation of UI) apparatus 14 such as a touch panel or a liquid crystal display, a Global Positioning System (GPS) receiving unit 15, and an LPWA communication unit 16.

The above components are connected to each other via a control bus 17.

The CPU 11 executes predetermined processing based on a control program stored in the memory 12 or the storage device 13 to control the operations of the mobile terminal apparatus 10.

In the present exemplary embodiment, it is described that the CPU 11 reads and executes the control program stored in the memory 12 or the storage device 13, but the program may also be stored in a storage medium such as a CD-ROM and provided to the CPU 11.

Figure 3:
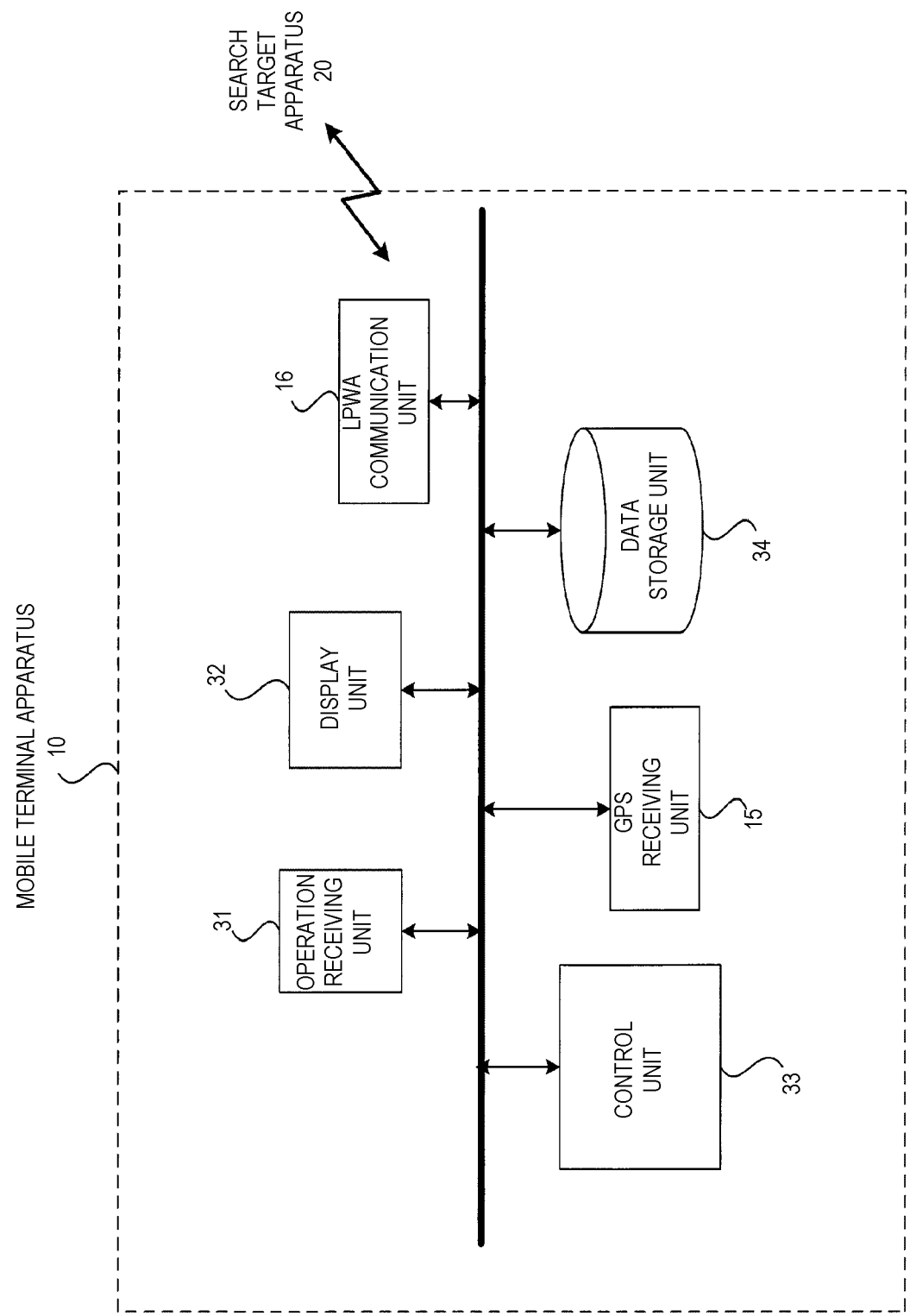
FIG. 3 is a block diagram showing the functional configuration of the mobile terminal apparatus 10 according to the exemplary embodiment of the present disclosure.

FIG. 3 is a block diagram showing the functional configuration of the mobile terminal apparatus 10 realized by execution of the control program.

As shown in FIG. 3, the mobile terminal apparatus 10 of the present exemplary embodiment includes a GPS receiving unit 15, an LPWA communication unit 16, an operation receiving unit 31, a display unit 32, a control unit 33, and a data storage unit 34.

The display unit 32 is controlled by the control unit 33 to display various kinds of information to the user.

The operation receiving unit 31 inputs various kinds of operation information performed by the user.

The GPS receiving unit 15 acquires information on the position of the mobile terminal apparatus by receiving GPS radio waves.

The LPWA communication unit 16 receives radio waves of the LPWA line transmitted from the search target apparatus 20.

The control unit 33 calculates the position of the search target apparatus 20 using pieces of information on the position of the mobile terminal apparatus acquired at plural measurement points by the GPS receiving unit 15 and the distance between the mobile terminal apparatus and the search target apparatus 20 estimated from the intensity of the radio waves received by the LPWA communication unit 16 at each of the plural measurement points.

For example, the control unit 33 calculates the position of the search target apparatus 20 by a calculation method based on three-point positioning using the results of measurement at three points.

At this time, the control unit 33 calculates the position of the search target apparatus 20 by preferentially using a piece of information acquired with a higher intensity of the radio waves from the search target apparatus 20 among pieces of information on the distance between the mobile terminal apparatus and the search target apparatus 20 at each measurement point and the pieces of information on the position of the mobile terminal apparatus acquired at the plural measurement points.

Further, the control unit 33 calculates the position of the search target apparatus 20 without using a piece of information acquired with a radio wave intensity lower by at least a predetermined value than other radio wave intensities continuously acquired among those of the radio waves received by the LPWA communication unit 16.

Then, the control unit 33 sends a notification to guide the searcher to the calculated position of the search target apparatus 20.

Specifically, the control unit 33 guides the searcher to the position of the search target apparatus 20 by displaying a moving direction for moving to the position of the search target apparatus 20 on the display unit 32.

Further, the control unit 33 may guide the searcher to the position of the search target apparatus 20 by displaying the distance between the mobile terminal apparatus and the search target apparatus 20 on the display unit 32 in addition to the moving direction.

Next, the operations of the mobile terminal apparatus 10 in the position search system of the present exemplary embodiment will be described in detail with reference to the drawings.

Figure 4:
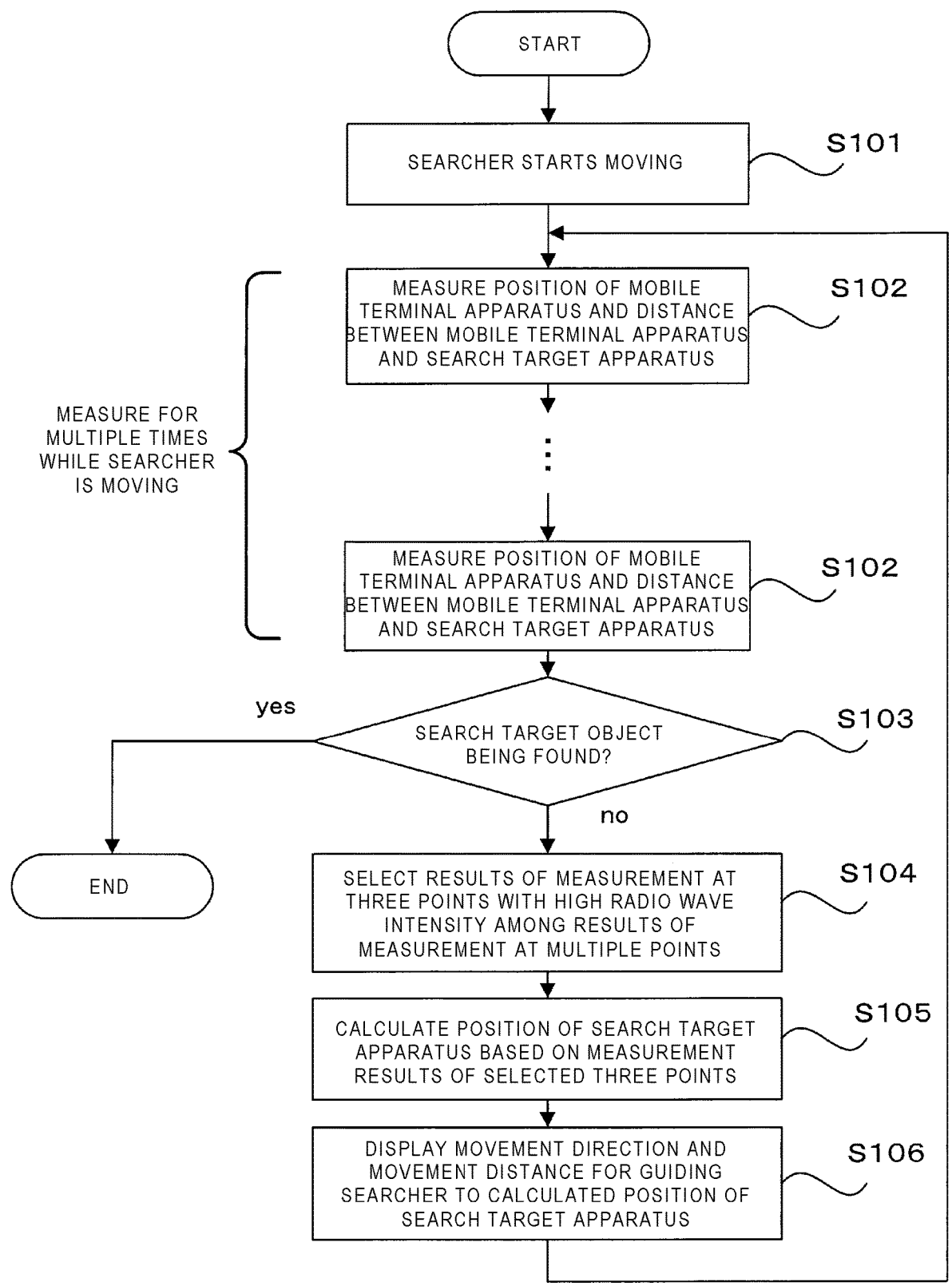
FIG. 4 is a flowchart showing operations of the mobile terminal apparatus 10 according to the exemplary embodiment of the present disclosure.

First, the operations performed when searching for the search target apparatus 20 by the mobile terminal apparatus 10 of the present exemplary embodiment is shown in the flowchart of FIG. 4.

When the searcher starts moving and instructs the mobile terminal apparatus 10 to search for the search target apparatus 20, the mobile terminal apparatus 10 starts receiving the LPWA line radio waves including the identification information on the search target apparatus 20 in step S101.

Figure 5:
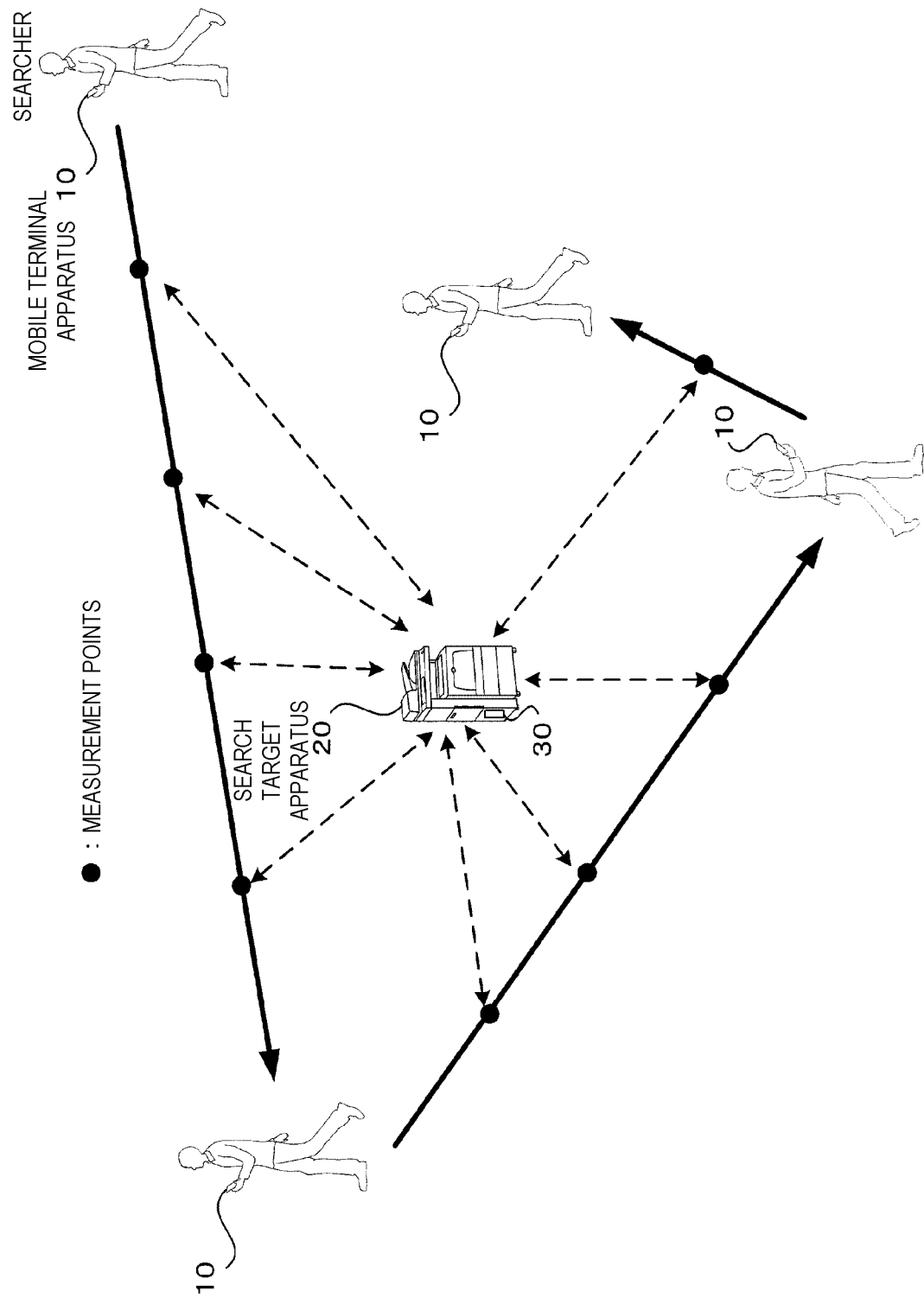
FIG. 5 is a diagram showing how measurement is performed at plural measurement points by the mobile terminal apparatus 10 while the searcher holding the mobile terminal apparatus 10 is moving.

Then, the searcher moves while holding the mobile terminal apparatus 10, so that as shown in FIG. 5, the mobile terminal apparatus 10 receives the radio waves of the beacon signals transmitted from the search target apparatus 20 at various locations and measures the intensity of the radio waves received from the search target apparatus 20 and information on the position of the mobile terminal apparatus in step S102.

As described above, FIG. 5 shows how measurement is performed at plural measurement points by the mobile terminal apparatus 10 while the searcher holding the mobile terminal apparatus 10 is moving.

Here, the measurement of the radio wave intensity of the radio waves transmitted from the search target apparatus 20 may be performed at predetermined intervals, for example, at intervals of ten seconds or one minute, or may be performed when the searcher operates the mobile terminal apparatus 10 to perform a measurement instruction.

Then, such measurement is performed at plural measurement points while the searcher is moving.

An example of measurement data obtained by such measurement is shown in FIG. 6.

Referring to FIG. 6, pieces of information on the position of the mobile terminal apparatus and radio wave intensities measured at plural measurement points and pieces of information on the distance from the mobile terminal apparatus to the search target apparatus 20 calculated using the measured radio wave intensities are stored in association with the measurement points.

Then, in step S103, when the searcher does not find the search target apparatus, the mobile terminal apparatus 10 selects, in step S104, the results of measurement at three points with strong radio wave intensity among the results of measurement at plural specific points shown in FIG. 6.

Note that, at this time, the control unit 33 of the mobile terminal apparatus 10 selects measurement data for calculating the position of the search target apparatus 20, except for measurement data having significantly low radio wave intensity as compared with those at other measurement points.

Figure 7:
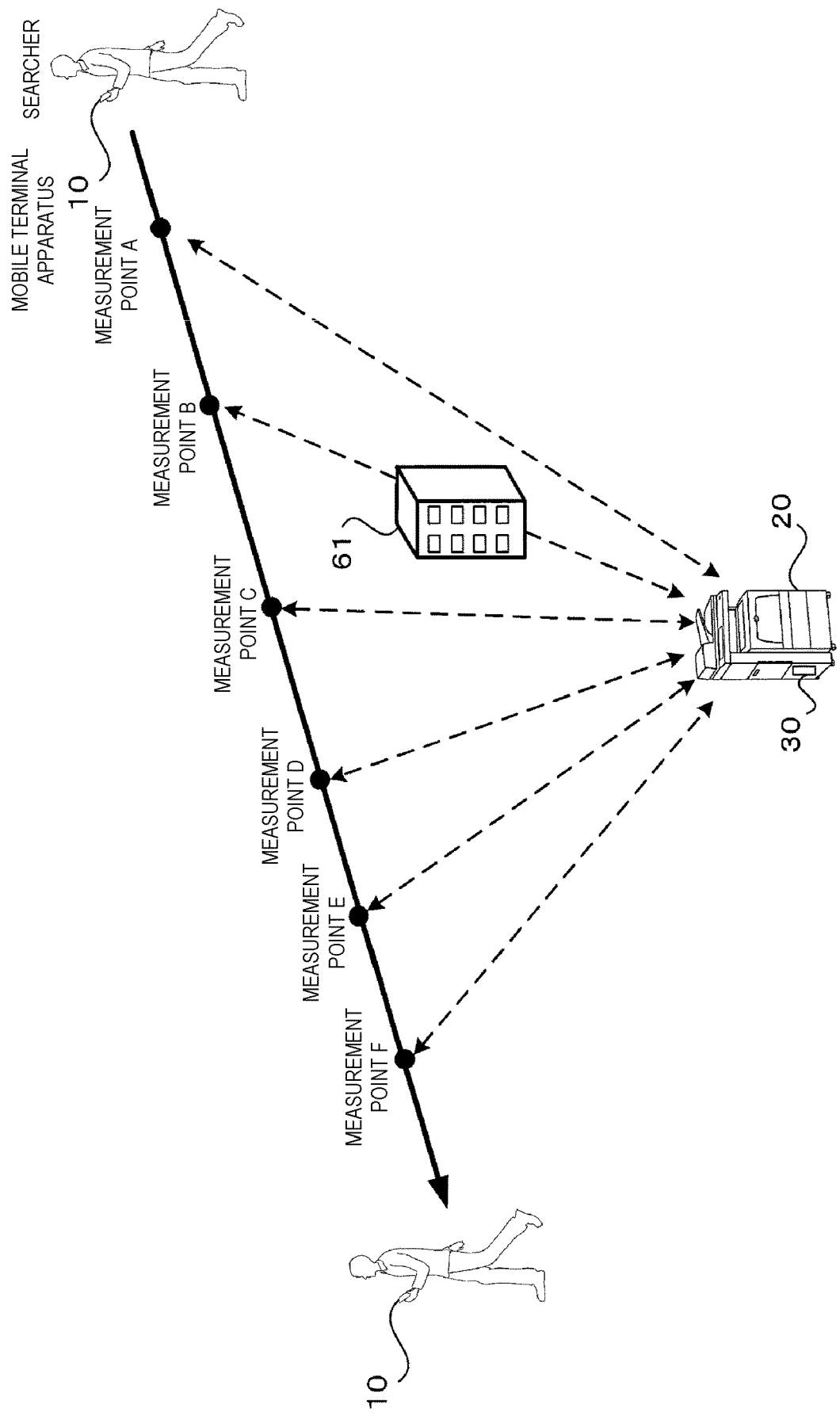
FIG. 7 is a diagram for showing a state in which a radio wave shielding object 61 exists between a measurement point B and a search target apparatus 20.

Specifically, as shown in FIG. 7, when a radio wave shielding object 61 exists between the measurement point B and the search target apparatus 20, the radio wave intensity in the measurement data at the measurement point B is significantly weaker as compared with other measurement points.

Therefore, the control unit 33 selects measurement data for calculating the position of the search target apparatus 20 from other measurement data except for the measurement data at the measurement point B.

Then, in the mobile terminal apparatus 10, the control unit 33 calculates the position of the search target apparatus 20 based on the results of measurement at the selected three points in step S105.

Figure 8:
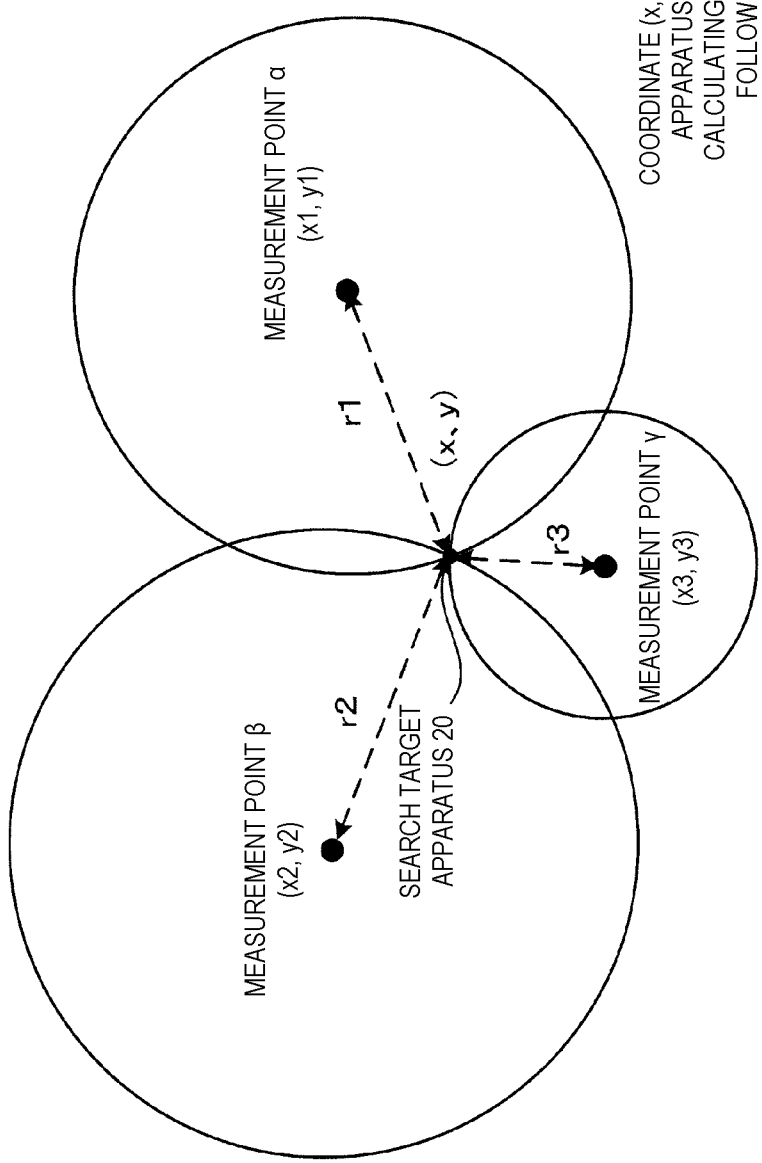
FIG. 8 is a diagram showing a specific example of a calculation method when calculating the position of the search target apparatus 20.

A specific example of a method for calculating the position of the search target apparatus 20 is shown in FIG. 8.

The calculation method shown in FIG. 8 is a calculation method based on three-point positioning, and shows an example in which the position of the search target apparatus 20 is calculated based on distances from three measurement points, which are measurement points α, β, and γ.

When the coordinate of the measurement point α is (x1, y1), a distance between the measurement point α and the search target apparatus 20 is r1; the coordinate of the measurement point β is (x2, y2), a distance between the measurement point β and the search target apparatus 20 is r2; and the coordinate of the measurement point γ is (x3, y3), a distance between the measurement point γ and the search target apparatus 20 is r3, the coordinate (x, y) of the search target apparatus 20 is obtained by calculating values satisfying the following formulas.

$$(x-x1)^2+(y-y1)^2=r1^2$$

$$(x-x2)^2+(y-y2)^2=r2^2$$

$$(x-x3)^2+(y-y3)^2=r3^2$$

Then, in step S106, the control unit 33 of the mobile terminal apparatus 10 displays a moving direction and a moving distance for guiding the searcher to the calculated position of the search target apparatus 20 on the display unit 32.

Figure 9:
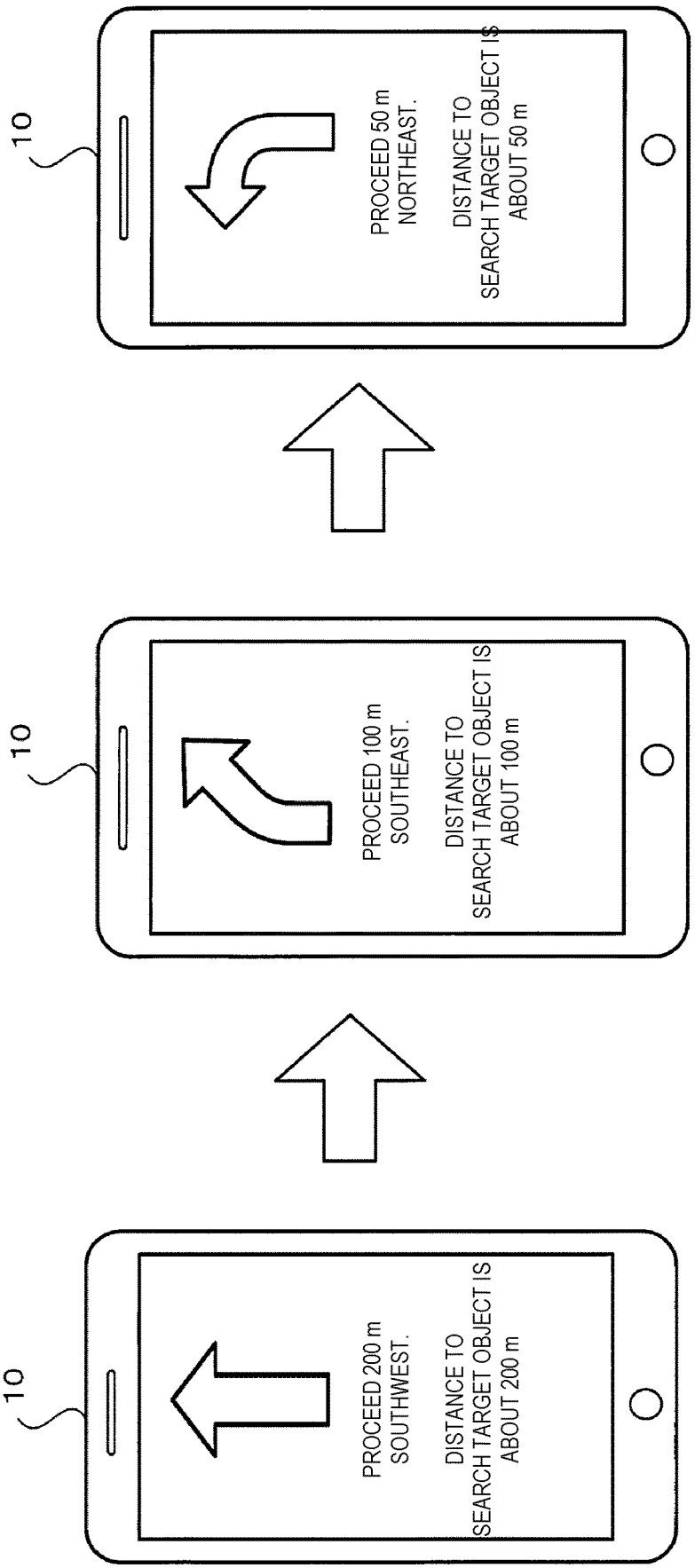
FIG. 9 is a diagram showing an example of a display screen in the mobile terminal apparatus 10 when the searcher is guided to the position of the search target apparatus 20.

An example of a display screen in the mobile terminal apparatus 10 displayed in the above manner is shown in FIG. 9.

FIG. 9 shows an example in which a remaining distance to the search target apparatus 20 is displayed to the searcher in addition to the moving direction and the moving distance to the search target apparatus 20.

The display screen for guiding the searcher to the position of the search target apparatus 20 keeps being updated while the searcher is moving.

The mobile terminal apparatus 10 may detect a direction in which the searcher is currently facing by a geomagnetic sensor, a gyro sensor, or the like, and display a moving direction in which the searcher should move based on the detected direction in which the searcher is facing and the direction to the position of the search target apparatus 20.

In the above description, the case where the position of the search target apparatus 20 is searched by the mobile terminal apparatus 10 alone is described. However, the position of the search target apparatus 20 may also be searched by first, using the installed LPWA communication network to grasp a rough position of the search target apparatus 20, and then using the mobile terminal apparatus 10.

A state in which the position of the search target apparatus 20 is searched in the above manner will be described with reference to FIGS. 10 and 11.

Figure 10:
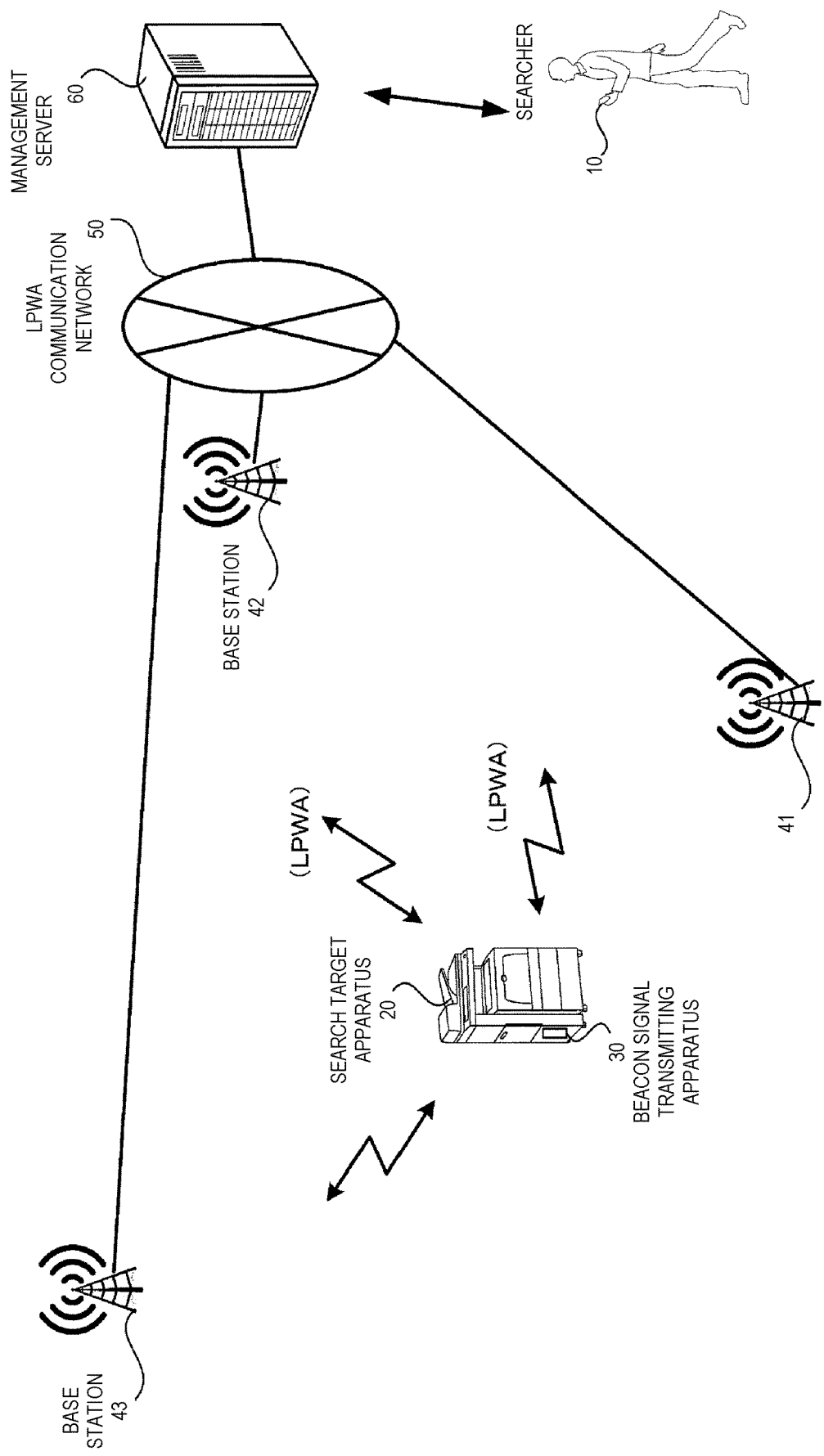
FIG. 10 is a diagram for showing a state in which a rough position of the search target apparatus 20 is grasped by using a LPWA communication network installed first.

FIG. 10 shows a case where the rough position of the search target apparatus 20 is specified using three fixed base stations 41 to 43 and a communication system that connects the base stations 41 to 43 and a management server 60 via an LPWA communication network 50.

In the management server 60, since the positions of the base stations 41 to 43 are known in advance, the position of the search target apparatus 20 can be calculated by the three-point positioning method as shown in FIG. 8 using the information on the positions of the base stations 41 to 43 and using the intensities of the radio waves through the LPWA line from the search target apparatus 20 received by the base stations 41 to 43 separately.

Then, in the mobile terminal apparatus 10 of the searcher, the information on the position of the search target apparatus 20 is acquired from the management server 60 and displayed on the display unit 32, so that the searcher can grasp the rough position of the search target apparatus 20.

Figure 11:
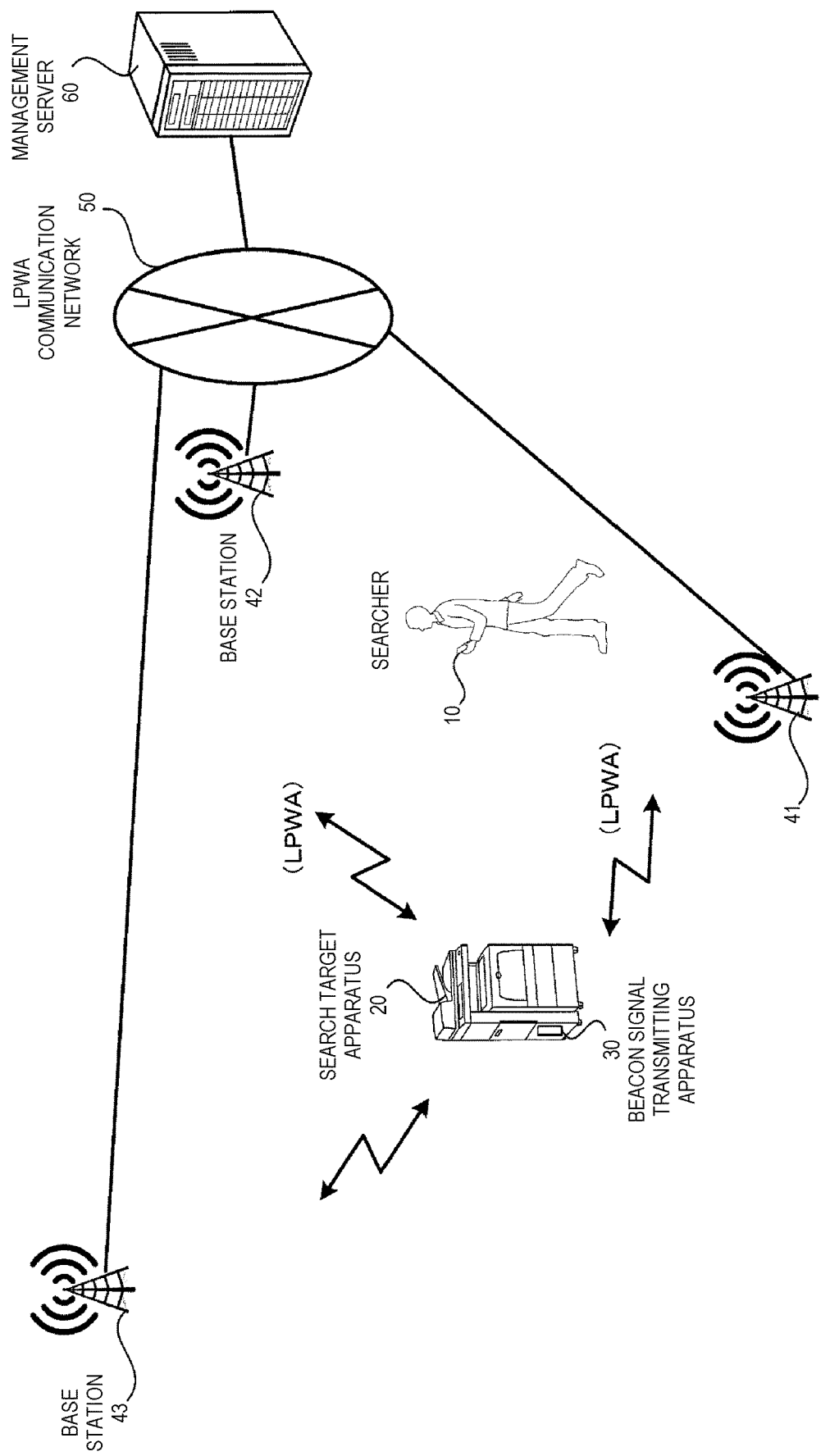
FIG. 11 is a diagram for showing a state in which a rough position of the search target apparatus 20 is grasped by using the LPWA communication network installed at first, and then a position of the search target apparatus 20 is searched by using the mobile terminal apparatus 10.

Then, as shown in FIG. 11, the searcher moves close to the search target apparatus 20, and the search target apparatus 20 can be searched and found by using the mobile terminal apparatus 10.

When the rough position of the search target apparatus 20 is calculated using the LPWA communication network as shown in FIGS. 10 and 11, the mobile terminal apparatus 10 may search for the position of the search target apparatus 20 using radio waves of BLE (abbreviation of Bluetooth (registered trademark) Low Energy) communication instead of the radio waves of the LPWA line.

The arrival distance of the radio waves for the BLE communication is shorter than that of the radio waves for the LPWA line. However, when BLE communication radio waves are used, the position of the search target apparatus 20 can be searched for with a higher accuracy than when the LPWA line radio waves are used.

In such a configuration, the mobile terminal apparatus 10 includes a BLE receiving unit, and the control unit 33 causes the management server 60 to acquire information on an estimated distance between the search target apparatus 20 and a receiving position obtained by receiving, from the search target apparatus 20, radio waves of the LPWA line in a frequency band different from that of the radio waves receivable by the BLE receiving unit, and information on the receiving position; and calculates the rough position of the search target apparatus 20 using the above information.

Then, the control unit 33 performs a notification for guiding the searcher to the calculated rough position of the search target apparatus 20.

Then, when the distance between the mobile terminal apparatus and the search target apparatus 20 is equal to or less than a predetermined distance, the control unit 33 continues calculating the position of the search target apparatus 20 by using the information on the position of the mobile terminal apparatus acquired at plural measurement points by the GPS receiving unit 15 and using the distance between the mobile terminal apparatus and the search target apparatus 20 estimated from the intensity of the radio waves received by the BLE receiving unit at each of the plural measurement points and continues guiding the searcher to the calculated position.

In such a case, as described above, the radio waves through the LPWA line in the frequency band different from that of the radio waves receivable by the BLE receiving unit provide a position measurement accuracy lower than the radio waves receivable by the BLE receiving unit and make wide area communication possible.

Modified Example

In the above exemplary embodiment, a case where the position of a search target apparatus is searched by a mobile terminal apparatus such as a smartphone is used for description, but the present disclosure is not limited thereto, and the present disclosure can be similarly applied to a case where the position of the search target apparatus is searched by various information processing apparatuses other than the mobile terminal apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an acquisition unit configured to acquire pieces of information on position of the information processing apparatus;
   a receiving unit configured to receive radio waves from a search target apparatus;
   a calculation unit configured to calculate the position of the search target apparatus using the pieces of information on position of the information processing apparatus acquired at a first plurality of points by the acquisition unit and using a distance between the information processing apparatus and the search target apparatus estimated from an intensity of the radio waves received by the receiving unit at each of the first plurality of points, the first plurality of points being selected from a second plurality of points, the first plurality of points being ones of the second plurality of points that have the intensity of the radio waves above a predetermined threshold, the second plurality of points being larger than the first plurality of points; and
   a notification unit configured to send notification to guide a searcher to the position of the search target apparatus calculated by the calculation unit.

2. The information processing apparatus according to claim 1, wherein
   the calculation unit calculates the position of the search target apparatus by preferentially using a piece of information acquired with a higher intensity of the radio waves from the search target apparatus among the pieces of information on position of the information processing apparatus acquired at the first plurality of points and pieces of information on the distance between the information processing apparatus and the search target apparatus acquired at the points.

3. The information processing apparatus according to claim 1, wherein
   the calculation unit calculates the position of the search target apparatus without using a piece of information acquired with a radio wave intensity lower by at least a predetermined value than other radio wave intensities continuously acquired among those of the radio waves received by the receiving unit.

4. The information processing apparatus according to claim 1, wherein
   the notification unit guides the searcher to the position of the search target apparatus by displaying a moving direction for moving to the position of the search target apparatus.

5. The information processing apparatus according to claim 4, wherein
   the notification unit guides the searcher to the position of the search target apparatus by displaying a distance between the information processing apparatus and the search target apparatus in addition to the moving direction.

6. The information processing apparatus according to claim 1, wherein
   the calculation unit calculates a rough position of the search target apparatus by using an estimated distance between the search target apparatus and a receiving position obtained by receiving, from the search target apparatus, radio waves in a frequency band different from that of the radio waves receivable by the receiving unit and using the receiving position,
   the notification unit sends notification to guide the searcher to the rough position of the search target apparatus calculated by the calculation unit, and
   when the distance between the information processing apparatus and the search target apparatus is equal to or less than a predetermined distance, the calculation unit calculates the position of the search target apparatus by using the pieces of information on position of the information processing apparatus acquired at the first plurality of points by the acquisition unit and using a distance between the information processing apparatus and the search target apparatus estimated from the intensity of the radio waves received by the receiving unit at each of the first plurality of points.

7. The information processing apparatus according to claim 6, wherein
   the radio waves in the frequency band different from the radio waves receivable by the receiving unit are radio waves that provide a position measurement accuracy lower than the radio waves receivable by the receiving unit and that are configured to allow for wide area communication.

8. A non-transitory computer readable medium storing a program causing a computer to execute an information processing process, the process comprising:
   acquiring pieces of information on position of an information processing apparatus;
   receiving radio waves from a search target apparatus;

calculating the position of the search target apparatus using the pieces of information on position of the information processing apparatus acquired at a first plurality of points in the acquiring step and using a distance between the information processing apparatus and the search target apparatus estimated from an intensity of the radio waves received in the receiving step at each of the first plurality of points, the first plurality of points being selected from a second plurality of points, the first plurality of points being ones of the second plurality of points that have the intensity of the radio waves above a predetermined threshold, the second plurality of points being larger than the first plurality of points; and sending notification to guide a searcher to the position of the search target apparatus calculated in the calculation step.

* * * * *